US010148636B2

(12) United States Patent
Asveren

(10) Patent No.: US 10,148,636 B2
(45) Date of Patent: *Dec. 4, 2018

(54) AUTHENTICATION METHODS AND APPARATUS

(71) Applicant: Sonus Networks, Inc., Westford, MA (US)

(72) Inventor: Tolga Asveren, Bordentown, NJ (US)

(73) Assignee: Sonus Networks, Inc., Westford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/396,373

(22) Filed: Dec. 30, 2016

(65) Prior Publication Data

US 2017/0111343 A1 Apr. 20, 2017

Related U.S. Application Data

(63) Continuation of application No. 14/681,273, filed on Apr. 8, 2015, now Pat. No. 9,571,480.

(51) Int. Cl.
*H04L 29/06* (2006.01)
*H04W 12/06* (2009.01)
(Continued)

(52) U.S. Cl.
CPC .............. *H04L 63/08* (2013.01); *G06F 21/44* (2013.01); *H04L 9/3226* (2013.01);
(Continued)

(58) Field of Classification Search
CPC ..... H04L 63/08; H04L 63/10; H04L 65/1006; H04L 9/3226; H04L 65/1073;
(Continued)

(56) References Cited

U.S. PATENT DOCUMENTS 9,137,028 B1 * 9/2015 McConkey ......... H04L 12/1813
2009/0191844 A1 * 7/2009 Morgan ................ H04W 12/06
455/411

(Continued)

OTHER PUBLICATIONS

Maiti, Abhranil, Inyoung Kim, and Patrick Schaumont. "A robust physical unclonable function with enhanced challenge-response set." IEEE Transactions on Information Forensics and Security 7.1 (2012): 333-345.*

(Continued)

*Primary Examiner* — Chau Le
(74) *Attorney, Agent, or Firm* — Straub & Straub; Stephen T. Straub; Michael P. Straub

(57) ABSTRACT

Methods and apparatus for authenticating a user equipment device (UE) requesting services through a session border controller (SBC) are described. In some embodiments the SBC stores the challenge and response for a successfully authenticated UE and uses this information to authenticate the UE when the UE seeks access to a service, e.g., establishing a new TCP connection. In some other embodiments, in response to receiving an Invite request from a UE requesting service the SBC generates and sends a Registration request to an authentication entity on behalf of the UE to trigger an authentication process. If the UE is authenticated the SBC allows service access, e.g., allows a call to proceed, otherwise denies service to the UE.

14 Claims, 11 Drawing Sheets

(51) Int. Cl.
  *G06F 21/44* (2013.01)
  *H04L 9/32* (2006.01)
  *H04L 29/08* (2006.01)
(52) U.S. Cl.
  CPC ............ *H04L 9/3271* (2013.01); *H04L 63/10* (2013.01); *H04L 65/1006* (2013.01); *H04L 65/1073* (2013.01); *H04W 12/06* (2013.01); *G06F 2221/2103* (2013.01); *H04L 67/02* (2013.01)
(58) Field of Classification Search
  CPC ...... H04L 9/3271; H04L 67/02; H04W 12/06; G06F 21/44; G06F 2221/2103
  See application file for complete search history.

(56) References Cited

U.S. PATENT DOCUMENTS

| | | | | |
|---|---|---|---|---|
| 2010/0082828 | A1* | 4/2010 | Jennings | H04L 63/08 709/229 |
| 2010/0082977 | A1* | 4/2010 | Boyle | H04L 63/0815 713/158 |
| 2010/0217837 | A1* | 8/2010 | Ansari | G06Q 30/04 709/218 |
| 2011/0145575 | A1* | 6/2011 | Blommaert | H04L 63/083 713/168 |
| 2015/0058928 | A1* | 2/2015 | Guo | H04L 63/08 726/3 |
| 2015/0229635 | A1* | 8/2015 | Saridaki | H04L 63/0815 726/8 |
| 2016/0191573 | A1* | 6/2016 | Zehavi | H04L 65/1073 709/203 |

OTHER PUBLICATIONS

Gassend, Blaise, et al. "Silicon physical random functions." Proceedings of the 9th ACM conference on Computer and communications security. ACM, 2002.*

Lee, Jae W., et al. "A technique to build a secret key in integrated circuits for identification and authentication applications." VLSI Circuits, 2004. Digest of Technical Papers. 2004 Symposium on. IEEE, 2004.*

* cited by examiner

AUTHENTICATION METHODS AND APPARATUS

RELATED APPLICATIONS

The present application is a continuation of U.S. patent application Ser. No. 14/681,273 filed Apr. 8, 2015 which is hereby expressly incorporated by reference in its entirety.

FIELD OF INVENTION

The present invention relates to methods and apparatus for authenticating a new connection, device and/or user attempting to access network services, e.g., calling services.

BACKGROUND

In communication networks which support Session Initiation Protocol (SIP), user equipment devices (UEs) register with the network before they can place or receive calls. When Transmission Control Protocol (TCP) is used as the transport protocol, there are cases where the TCP connection established during the registration process is not used for calls initiated by the UE at a later time. In many cases a UE device establishes a new TCP connection for each call. There are also scenarios, where a session border controller (SBC) failover causes similar behavior thus causing the establishment of a new TCP connection for a new call as TCP connections are not preserved after a SBC failover. After the detection by a UE device that its TCP connection toward the SBC is lost such as for example during a SBC failover event, when the UE device attempts to place a new call it initiates a new TCP connection. This results in the signaling for the new call being sent over the new TCP connection. In such cases, the SBC receives a new call request over a new TCP connection.

While in many cases it is possible that the UE that has been previously authenticated establishes a new TCP connection for placing a new call, still there is no guarantee that a UE attempting to place a call over a new TCP connection is actually a legitimate device that has been previously authenticated. It is possible that an attacker with malicious intent may attempt to place a call over a new TCP connection. Thus there is a need to take steps to ensure that the new TCP connection is indeed initiated by a legitimate user and/or UE rather than an attacker.

In many communications systems, such as for example many systems using SIP based signaling, to authenticate a new TCP connection, the SBC relies on a Registrar challenging the INVITE requests of registered initiators. See for example, Request For Comment 2617 by the Internet Engineering Task Force entitled: "HTTP Authentication: Basic and Digest Access Authentication" which discusses authentication processes. If the authentication process involving this INVITE-Challenge-Response is successful, the SBC concludes that the initiator is who it claims to be. However, not all Registrars challenge INVITE requests. Some Registrars only challenge REGISTER requests and not INVITE requests. In such systems, once the initiator is registered INVITE requests are not challenged.

From the above discussion it should be appreciated that there is a need for methods and apparatus for authenticating a device and/or user attempting to access a service, such as for example, establish a call, over a new TCP connection, and/or for authenticating a new TCP connection/call when the Registrar does not challenge INVITE requests. It should be further appreciated that there is also a need for new methods and apparatus wherein a device such as a session border controller which does not have access or possession of an authentication secret or key used by an authentication entity which normally performs the authentication operations to be able to provide device and/or connection authentication.

SUMMARY

Various features relating to methods and apparatus for authenticating a device and/or a user attempting to access network services, e.g., calling services, through a session border controller (SBC), are described.

While normally authentication of a REGISTER request is performed by the Registrar and an SBC just passes through relevant information since the SBC does not have access to user authentication keys and/or passwords for authenticating the user or user equipment (UE), in accordance with the features of the invention, a SBC stores the authentication related information, which was exchanged during registration by the user or UE and uses that stored information to authenticate requests from the user or UE at a later time, e.g., in response to INVITE or other requests initiated after registration. In various embodiments such as those that use a nonce the in authentication process, Transport Layer Security (TLS) is used between the SBC and UE to prevent an attacker from peeking into the messages thus using the same nonce value twice (once during registration by the Registrar and once by the SBC to authenticate an INVITE request) and thus avoiding security threats.

In some embodiments a session border controller monitors a challenge and authentication signaling exchange which occurs as part of a UE registration process. The registration process involves an authenticating entity passing a challenge, to a UE seeking service, through the SBC, and the UE responding to the challenge through the SBC and the authenticating entity then sending a signal through the SBC indicative of whether the UE was successfully authenticated or not. In addition to acting as a forwarding device through which the challenge, response and signaling indicative of the outcome of the authentication process is passed, the SBC stores the challenge and response for UEs who are successfully authenticated, e.g., during initial registration. The stored challenge and response information is then used by the SBC to authenticate a UE seeking additional services, e.g., the initiation of a new call through the SBC using a new TCP connection. In this manner the SBC can authenticate a UE seeking services, which was previously authenticated, without having to go back to the authenticating entity and without having knowledge of the key or secret used to authenticate the UE.

An exemplary method of operating a session border controller in accordance with an exemplary embodiment comprises: storing a challenge communicated to a UE through the session border controller, said challenge being from an authenticating entity; storing a response to the challenge communicated from the UE to the authenticating entity, said response having been determined to be valid by said authenticating entity; receiving a signal from a UE requesting service as part of an attempt to obtain new service through the session border controller; sending the stored challenge to the UE requesting service prior to providing the new service to the UE; and checking a response received from the UE requesting service to determine if the UE which is requesting service is the UE which was previously authenticated.

In accordance with another aspect of another embodiment of the invention where cnonce is used to prevent reuse of the same challenge and response, the SBC monitors a UE registration and determines that cnonce functionality is being used as part of the authentication process. With the successful registration by a UE that has successfully been authenticated using an authentication process which supports cnonce use, the SBC stores information from the registration request used by the UE to register with the Registrar, and information indicating that the cnonce is being used. The stored information can then be used by the SBC to generate a new registration request on behalf of the already registered UE should the SBC want to authenticate the UE in response to a device identifying itself as the registered UE seeking services. After establishment of a new TCP connection by the UE as part of establishing a new call through the SBC, the UE sends an INVITE request as part of the call establishment process. In response to the INVITE request from the UE seeking to make a call or establish another session, and prior to allowing the call to proceed, the SBC sends a new Register message to an authentication entity indicating the UE as the sender of the Register message to trigger an authentication process corresponding to the UE.

In response to the Register message, the SBC receives a challenge (e.g., WWW-authenticate value) which is then passed to the UE as part of a challenge message sent in response to the Invite. The SBC then receives the response to the challenge message and sends it as a response to the authentication entity, e.g., registrar, in a Register request with credentials, e.g., with authorization response value, identity information and/or other information. The Registrar, which is the authenticating entity, calculates the response it expects and determines if the session border controller provided the expected response value. In the case where the authentication is successful the Registrar responds to the SBC indicating that the registration of the UE has been successful. The SBC receives the response to the registration request from the Registrar and if the registration was successful considers the UE to have been authenticated and allows the call to proceed. If the Registrar indicates the registration was unsuccessful, the SBC interprets the unsuccessful registration as an authentication failure and prevents the call from the UE from proceeding further. In this way, through use of a registration processes initiated by the SBC on behalf of the UE, the SBC can authenticate the UE without having access to the secret or key used by the authenticating entity, e.g., Registrar, to authenticate a UE.

An exemplary method of operating a session border controller, comprises: receiving a signal, e.g., Invite message, from a UE seeking to establish a communication session through the SBC; sending a registration request for the UE, generated by the session border controller, to an authenticating entity; receiving a challenge from the authenticating entity in response to the registration request; sending the challenge to the UE in response to the signal, e.g., Invite signal, from the UE seeking to establish the communication session through the SBC; and using a response to the challenge sent to the UE to authenticate the UE.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3 comprises the combination of FIGS. 3A and 3B.

DETAILED DESCRIPTION

Figure 1:
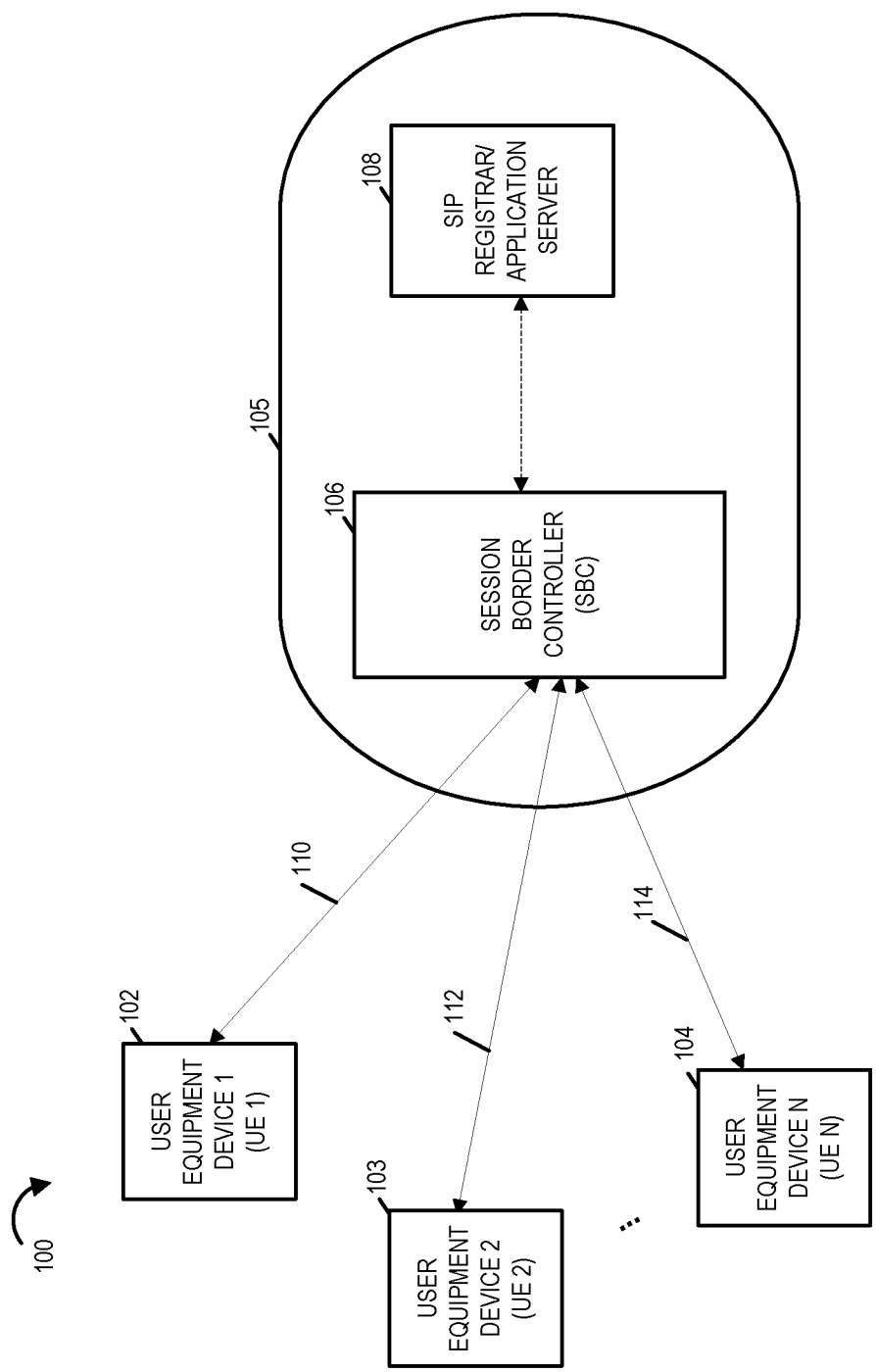
FIG. 1 illustrates an exemplary system 100 implemented in accordance with an exemplary embodiment of the invention.

FIG. 1 illustrates an exemplary system 100 in accordance with an exemplary embodiment. System 100 includes a plurality of user equipment (UE) devices, a network 105 with network elements including a session border controller (SBC) 106 and an SIP registration server 108. The SIP registration server 108 is also referred to as the SIP Registrar or simply the registrar. The plurality of user equipment (UE) devices include user equipment device 1 (UE 1) 102, user equipment device (UE 2) 103, . . . , user equipment device N (UE N) 104. Each user device is, e.g., a mobile or stationary communications device, that supports SIP signaling and is capable of communicating over an IP network. In various embodiments various user devices such as the ones shown in FIG. 1 include a SIP user agent. The UE devices UE 1 102, UE 2 103, . . . and UE N 104 are coupled to the SBC 106 via communication links 110, 112 and 114 respectively. In various embodiments the UE devices and the SBC 106 communicate and exchange information over a communications network formed by the communications links 110, 112, 114.

In some embodiments the exemplary session border controller (SBC) 106 and the SIP registration server 108 are located at an operator/service provider's site. In various embodiments the devices in the system 100 communicate using TCP (Transmission Control Protocol).

During normal operation in an SIP network, a user device, e.g., user device 1 102, registers with the network before the device can place and/or receive calls. The user device 1 102 that initiates the process to establish communications, e.g., by dialing other party's number and placing the call is sometimes referred to as the calling party while the other device which is being called is referred to as the called party.

As part of a registration process a user device sends a registration request message and/or an Invite message to the SIP registration server 108 that registers the user device with the network and facilitates call establishment. In various embodiments the SIP registrar authenticates the user device sending registration request and/or a connection prior to registering the device. As part of an authentication process the SIP registrar 108, following receipt of a registration request from a UE seeking service, challenges the UE which then responds to the challenge by sending a response. If the SIP registrar finds the response valid, e.g., including expected response information, the UE is authenticated and registered. In various embodiments one or more signals, e.g., requests and response to a challenge, from a UE (e.g., UE 102) go through the SBC 106 prior to reaching the SIP registrar 108. Similarly, in various embodiments one or more signals, e.g., challenge, acknowledgment signals, etc., from the SIP Registrar 108 go through the SBC 106 prior to reaching the UE 102.

While a connection, e.g., TCP connection, established during registration is authenticated, in many cases the user device does not use the connection established during registration but rather establishes a new TCP connection for a call. Furthermore during a session border controller (SBC) failure the earlier established and authenticated connection is not preserved.

Figure 2:
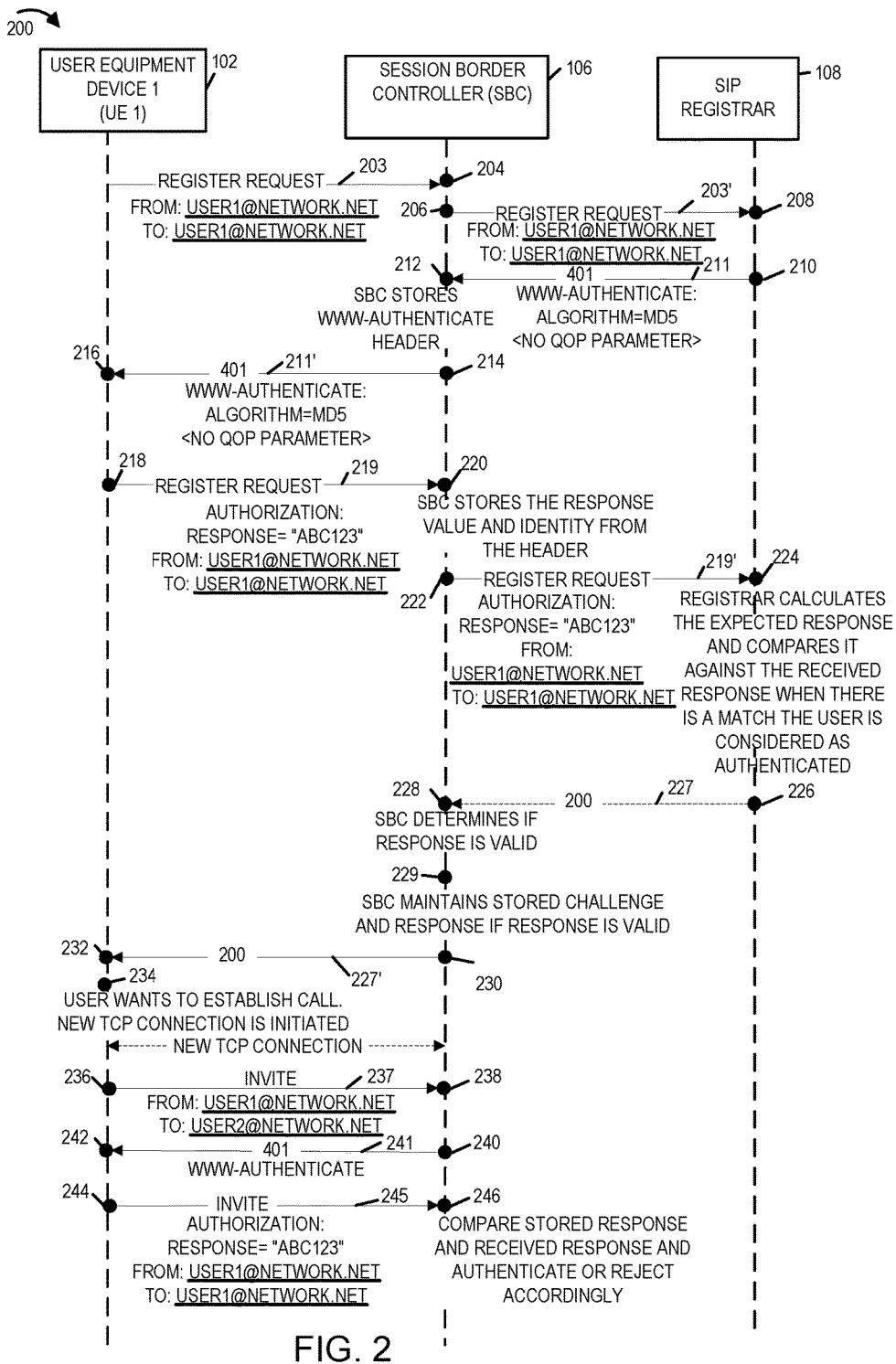
FIG. 2 illustrates the steps and associated signaling exchange between various devices/servers performed in an exemplary authentication process in accordance with an exemplary embodiment.

FIG. 2 is a drawing 200 illustrating the steps and associated signaling exchange between various devices/servers performed in an exemplary authentication process in accordance with an exemplary embodiment.

The embodiment shown in FIG. 2 illustrates an example where a UE device that has been previously authenticated by an authentication entity, e.g., SIP registrar 108, requests service, e.g., over a new TCP connection, at a later time and is authenticated by a session border controller. The UE device is initially authenticated during the registration process and in accordance with the invention the SBC then authenticates later requests for service from the UE device that has been previously authenticated by an authentication entity. Messages, information, content and/or signals communicated between devices are represented in FIG. 2 using arrows. At the top of FIG. 2, various elements of the system 100 which may participate in the exemplary process in accordance with one embodiment of the invention, are shown. The illustrated components include the user device (UE 1) 102, the SBC 106, and the SIP registrar 108.

The process starts in step 204 where the SBC 106 receives a registration request 203 from the user device 102. The SBC receives and processes the registration request in step 204. As part of the processing, in some embodiments the SBC 106 checks the registration request for a sender identifier and/or other information. Next in step 206 the SBC sends the registration request 203' to the SIP registrar 108. The SIP registrar 108 receives and processes the registration request 203' in step 208. Signals identified by reference numbers ending with a prime ('), are reformatted versions of the non-prime signal with the same reference numbers, e.g., signal 203' is a reformatted version of signal 203. The reformatting may include generating the signal from a received signal, reencapsulation, changing of routing information such as for example, changing the sender's and/or destination address, etc. In this example, the To and From Headers for the SIP Register Request 203 and 203' are To: USER1@NETWORK.NET and From: USER1@NETWORK.NET. Processing proceeds from step 208 to step 210.

In step 210 the SIP registrar 108 initiates a challenge-response authentication mechanism to authenticate the requesting UE device 102. Accordingly, in step 210 the SIP registrar sends a 401 challenge (message 211) to the SBC 106 to be sent to the UE device 102. In various embodiments the 401 challenge includes a WWW-Authenticate header including at least one applicable challenge to the requesting UE device. In some embodiments the algorithm used in the 401 challenge is MD5, however a different algorithm may and in some other embodiments is used. In some embodiments in the 401 challenge QOP (quality of protection) is not specified. In processing step 212 the SBC receives the 401 challenge and stores the challenge. In some embodiments the SBC stores the WWW-Authenticate header received in the 401 challenge.

Next in step 214 the SBC forwards the 401 challenge (as signal 211') to the UE device which receives and processes the forwarded challenge in step 216. In response to the 401 challenge 211', in step 218 the UE device sends a register request 219 including a response value in an authorization header and other credentials. As an example, for illustration purposes a register request 219 is shown that includes a response value: "ABC123" in the authorization header and the user's identity is indicated, e.g., indicating that the register request is from USER1@NETWORK.NET. In this example, the SIP Register Requests 219 and 219' include the following headers To: USER1@NETWORK.NET and From: USER1@NETWORK.NET. The SBC receives and processes the register request in step 220 and stores the response value in the authorization header as well as the identity.

Next in step 222 the SBC forwards the register request (as signal 219') to the SIP registrar 108. In step 224 the SIP registrar 108 receives the register request 219' and calculates the expected response that the registrar expected from the UE device in response to the 401 challenge, e.g., expected response value in the authorization header. The SIP registrar 108 compares the received response with the calculated response to determine whether or not there is a match. If there is a match the user is considered authentic, otherwise the user is considered not valid/authentic. For discussion purposes, FIG. 2 illustrates the case where the SIP registrar 108 finds that the user is authentic and responds accordingly thereafter as discussed below.

After determining that the user is authentic, in step 226 the SIP registrar 108 sends a signal 227 (e.g., 200 OK) to the UE through the SBC 106 indicating that the response (signal 219) from the UE is valid and confirming that authentication is successful. The SBC 106 receives the signal 227 in step 228 and determines that the response 219 from the UE to the 401 challenge is valid based on the received 200 OK from the authentication entity. Following the determination that the response is valid, in step 229 the SBC maintains the stored challenge (e.g., information from signal 211 stored in step 212) and the stored response (e.g., information from signal 219 stored in step 220) in a memory.

While not shown in the FIG. 2 example, in some embodiments when the authentication by the SIP registrar fails, the SIP registrar 108 sends another 401 challenge to the SBC 106 indicating that the authentication is unsuccessful and/or the response is invalid and the UE needs to respond to the 401 challenge again. In such embodiments when the authentication fails in step 224, the SBC upon determining that the response is invalid, discards the stored challenge and the stored response from the memory.

In step 230 the SBC forwards the 200 OK signal (as signal 227') to the UE 102 which receives it in step 232. Following an initial successful authentication, consider that at some point in time later the UE device 102 decides to establish a call, e.g., over a new TCP connection. In step 234 a new TCP connection is established.

In step 236 the UE device sends an INVITE signal 237 including the identity of the sender, e.g., FROM: USER1@NETWORK.NET. In this example, the INVITE signal 237 includes the following headers To: USER2@NETWORK.NET and From: USER1@NETWORK.NET. USER2@NETWORK.NET is the destination address for a call that UE 1 wants to establish. The SBC receives and processes the INVITE signal 237 in step 238. The SBC 106 uses the FROM header content, e.g., identity information and/or other information, to find the stored WWW-Authenticate header and the corresponding response value that the SBC stored (step 220). Based on the header content the SBC locates the stored WWW-Authenticate header and the response value and retrieves the response value.

In step 240 the SBC sends a challenge signal 241 (e.g., a 401 challenge) including the stored WWW-authentication header information (stored from the earlier 401 challenge 211) to the UE device. In step 242, the UE device 102 receives the challenge signal 241. Operation proceeds from step 242 to step 244. In step 244, in response to the challenge, the UE device sends an INVITE signal 245 including the response value "ABC123" in an authorization header and identification information, e.g., indicating that the INVITE is from: USER1@NETWORK.NET. In this example, the INVITE signal 245 includes the following headers To: USER2@NETWORK.NET and From: USER1@NETWORK.NET. USER2@NETWORK.NET is the destination address for a call that UE 1 wants to establish. It should be appreciated that the UE uses the same response value in the authorization header as used in the earlier response to the challenge during the registration process. The SBC receives and processes the INVITE signal 245 in step 246 and compares the received response with the stored response to determine whether or not there is a match. If there is a match the TCP connection/call is authenticated and the SBC relays the INVITE signal 237 to the network. If however there is no match then the INVITE is rejected and the TCP connection is closed.

Thus in the manner discussed above in the example of FIG. 2, the session border controller authenticates a new TCP connection/call without the involvement of the SIP Registrar, e.g., when Registrar does not challenge INVITE requests. The SBC stores the authentication related information exchanged during registration and uses that information to authenticate an INVITE (or other request(s)). Transport layer security (TLS) is used between SBC and UE in some embodiments to prevent an attacker from peeking into the messages thus in many cases the same nonce value can be used twice (e.g., once during registration by the SIP Registrar and once by the SBC to authenticate a later INVITE) without posing a security threat.

Figure 3A:
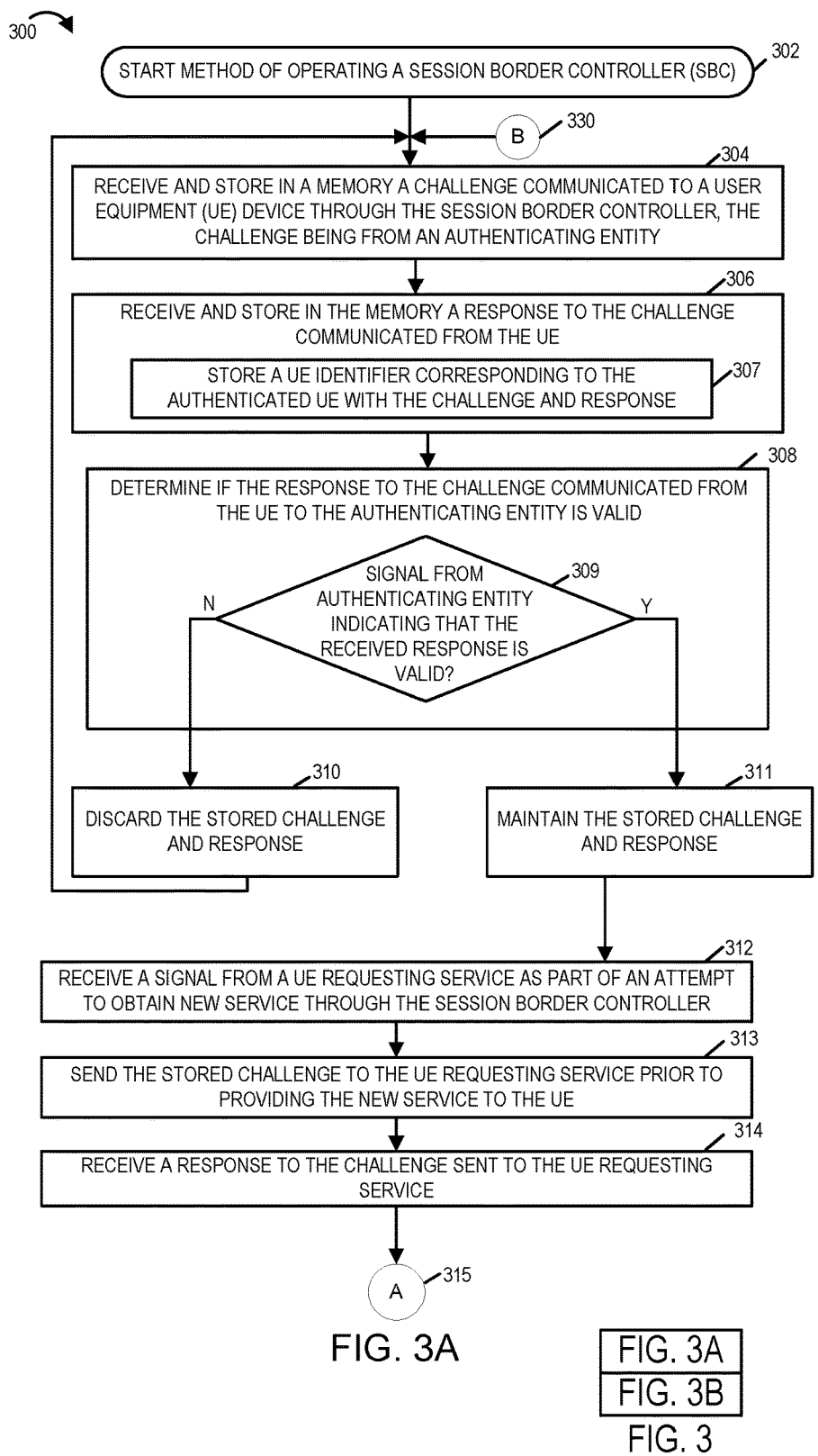
FIG. 3A illustrates a first part of a flowchart showing the steps of an exemplary method of operating a Session Border Controller (SBC) in accordance with one embodiment of the invention.
Figure 3B:
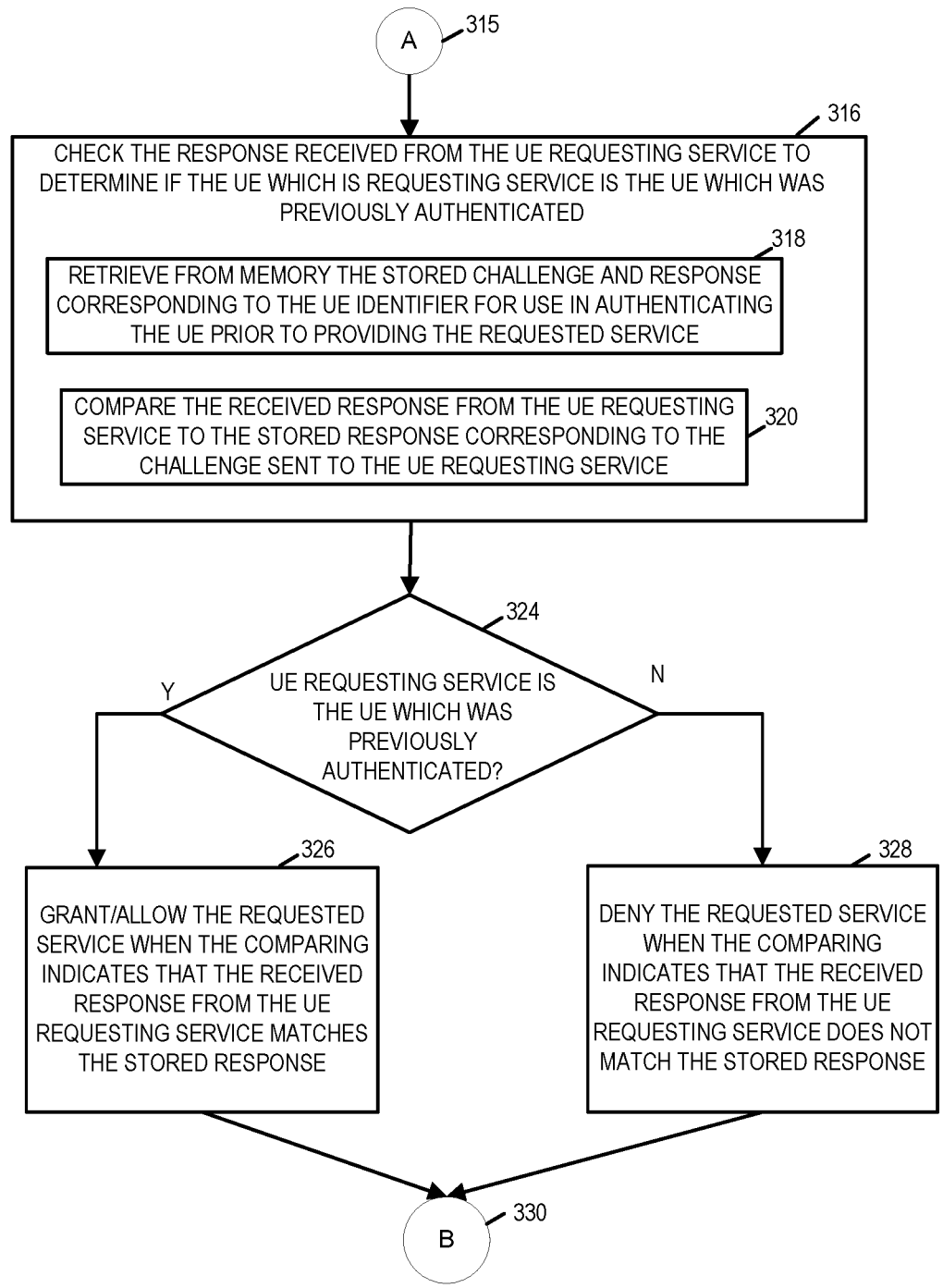
FIG. 3B illustrates a second part of the flowchart showing the steps of the flowchart of an exemplary method of operating a Session Border Controller (SBC).

FIG. 3, which comprises the combination of FIGS. 3A and 3B, is a flowchart of an exemplary method of operating a Session Border Controller (SBC) in accordance with one embodiment of the invention. The method of flowchart 300 includes steps performed by elements of an exemplary session border controller SBC 106 shown in the exemplary system 100 of FIG. 1.

The exemplary method starts in step 302, e.g., with the session border controller being initialized and starting to monitor for messages, e.g., registration messages, invite messages and/or other messages from devices in the system. The operation proceeds from step 302 to step 304. In step 304 the SBC receives and stores a challenge communicated to a user equipment (UE) device through the SBC, the challenge being from an authenticating entity, e.g., SIP registrar 108. In some embodiments the challenge communicated to the user equipment (UE) device through the SBC is a 401 message and includes a WWW-Authenticate header including at least one applicable challenge. One such exemplary challenge is illustrated in FIG. 2 example as signal 211.

Operation proceeds from step 304 to step 306. In step 306 the SBC receives and stores a response to the challenge communicated from the UE to the authenticating entity. In some embodiments the SBC stores the response to the challenge once it is determined response by the authenticating entity that the response is valid. In some embodiments step 306 includes step 307 wherein as part of storing the response the SBC stores the identity of UE, e.g., UE identifier, corresponding to the UE device sending the response. As will be discussed, in some embodiments the SBC initially temporarily stores the challenge, response and UE identifier and later (e.g., after the authenticating entity validates the response from the UE) decides to maintain the stored challenge and response information for later use in accordance with the features of the present invention. In some embodiments when it is determined that the response has failed validation/authentication then the SBC discards the stored challenge, response and UE identifier information.

Operation proceeds from step 306 to step 308. In step 308 the SBC determines whether the response (signal 219) to the challenge communicated from the UE to the authentication entity is found to be valid. In various embodiments the SBC makes the determination if the response (signal 219) is valid based on receipt of a acknowledgement signal (200 OK) from the authentication entity. Accordingly as part of step 308 of determining, step 309 is performed wherein the SBC determines whether a signal indicating that the response is valid/authentication success is received from the authentication entity. If it is determined that the signal indicating that the response is valid has been received the operation proceeds from step 308 to step 311, otherwise the operation proceeds to step 310.

In step 310 the SBC discards the stored challenge, response and UE identifier information after determining that the response has failed validation and the authentication was unsuccessful. Operation proceeds from step 310 to step 304 where the method starts again.

Returning to step 311. In step 311 the SBC maintains the stored challenge, response and UE identifier information after determining that the response is valid. Operation proceeds from step 311 to step 312. In step 312 the session border controller receives a signal from a UE device requesting service as part of an attempt to obtain new service through the session border controller. In some embodiments the signal from the UE requesting service is a SIP signal sent to the SBC 106 over a new TCP connection. In some embodiments the signal from the UE requesting service is an INVITE signal. In some embodiments the signal from the UE device requesting service includes the UE identifier as a source identifier.

Operation proceeds from step 312 to step 313. In step 313 the session border controller sends, in response to receiving the request from the UE device and after determining that the response from the UE was valid, the stored challenge (e.g., stored www-authenticate header content) to the UE requesting service prior to providing the new service to the UE. Operation proceeds from step 313 to step 314. In step 314 the session border controller receives, from the UE requesting service, a response (e.g., signal 245) to the challenge.

Operation proceeds from step 314 to step 316 via connecting node A 315. In step 316 the session border controller checks the response received from the UE requesting service to determine whether the UE device requesting service is the UE device which was previously authenticated. In various embodiments step 316 includes performing steps 318 and 320 as part of checking the response. In step 318 the SBC retrieves from memory the stored challenge and response corresponding to the UE identifier for use in authenticating the UE prior to providing the requested service. In step 320 the SBC compares the received response from the UE requesting service to the stored response corresponding to the challenge sent to the UE requesting service. In various embodiments the challenge and response communicated through the session border controller and stored are communicated as part of an authentication process performed as part of registering the UE device with the registrar.

Operation proceeds from step 316 to step 324. In some embodiments step 324 is performed as part of step 316. In step 324 the SBC determines based on the checks performed in step 316 if the UE device requesting service is the UE device which was previously authenticated. If in step 324 it is determined that the UE device requesting service is the same UE device which was previously authenticated, the operation proceeds from step 324 to step 326. In step 326 the SBC grants/allows the requested service to the UE requesting the service when the comparing indicates that the received response from the UE requesting service matches the stored response. Operation proceeds from step 326 back to step 304 via connecting node B 330. In various embodiments the SBC does not store or have knowledge of a secret or key used by the authenticating entity, e.g., SIP registrar, to authenticate the UE.

If in step 324 it is determined that the UE device requesting service is not the same UE device which was previously authenticated, e.g., based on the result of the comparing step indicating that the received response from the UE requesting service does not match the stored response, the operation proceeds from step 324 to step 328. In step 328 the SBC denies the requested service to the UE requesting the service. Operation proceeds from step 328 back to step 304 via connecting node B 330.

Figure 4:
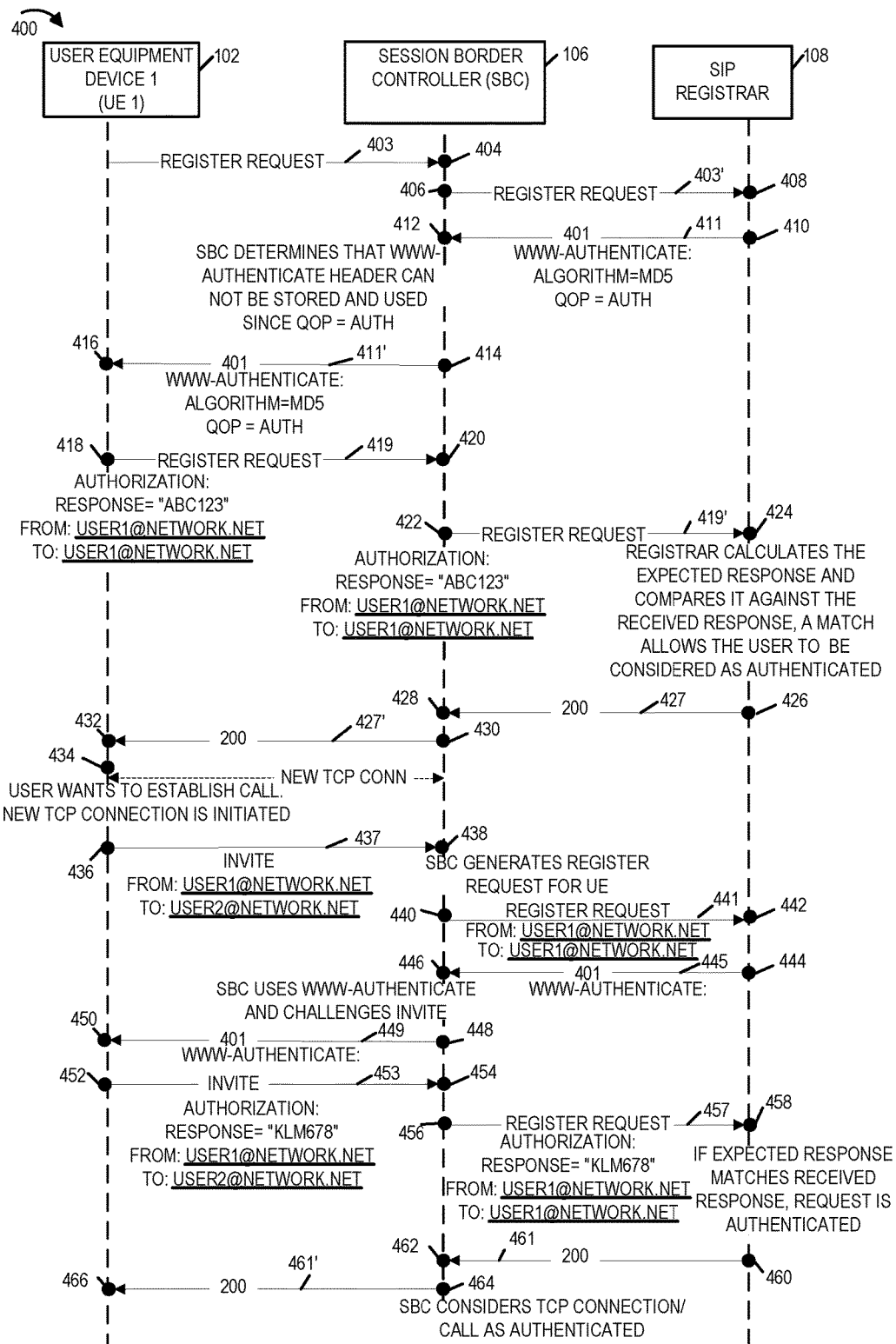
FIG. 4 illustrates the steps and associated signaling exchange between various devices/servers performed in another exemplary authentication process in accordance with an exemplary embodiment.

FIG. 4 is a drawing 400 illustrating the steps and associated signaling exchange between various devices/servers performed in another exemplary authentication process in accordance with an exemplary embodiment. FIG. 4 embodiment illustrates a case of a Digest authentication embodiment where a previously used challenge and response for authentication cannot be used again during a subsequent authentication because of the use of "cnonce" as part of the earlier authentication process.

Messages, information, content and/or signals communicated between devices are represented in FIG. 4 using arrows. At the top of FIG. 4, various elements of the system 100 which may participate in the exemplary process in accordance with one embodiment of the invention, are shown. The illustrated components include the user device 102, the SBC 106, and the SIP registrar 108.

The process starts in step 404 where the SBC 106 receives a registration request 403 from the user device 102. In this example, the signal 403 includes the following headers To: USER1@NETWORK.NET and From: USER1@NETWORK.NET. The SBC receives and processes the registration request in step 404. As part of the processing, in some embodiments the SBC 106 checks the registration request for sender identification information, destination address, and/or other information. In various embodiments the registration request 403 identifies the SIP registrar 108 as the destination for the registration request 403. In some embodiments the SBC 106 stores at least some information from the registration request 403, e.g., sender UE identifier, destination address specified in the registration request etc. Next in step 406 the SBC sends the registration request 403' to the SIP registrar 108. In this example, the signal 403' includes the following headers To: USER1@NETWORK.NET and From: USER1@NETWORK.NET. The SIP registrar 108 receives and processes the registration request 403' in step 408.

In step 410 the SIP registrar 108 initiates a challenge-response authentication mechanism to authenticate the requesting UE device 102. Accordingly, in step 410 the SIP registrar sends a 401 challenge (message 411) to the SBC 106 to be sent to the UE device 102. In various embodiments the 401 challenge includes a WWW-Authenticate header including at least one applicable challenge to the requesting UE device. In some embodiments the algorithm used in the 401 challenge is an MD5 algorithm, however a different algorithm may and in some other embodiments is used. As indicated by message 411 of FIG. 4, in some embodiments the 401 challenge specifies a QOP (quality of protection) in the WWW-Authenticate header. The QOP is a quoted string of one or more tokens indicating quality of protection values supported by the authentication entity. In the FIG. 4 example, the QOP value is indicated to be "auth" which indicates authentication.

In processing step 412 the SBC receives the 401 challenge and determines that the WWW-Authenticate header cannot be stored and used again since the quality of protection (QOP) is specified and set as "auth". Next in step 414 the SBC forwards the 401 challenge (as signal 411') to the UE device which receives and processes the forwarded challenge in step 416.

In response to the 401 challenge, in step 418 the UE device sends a register request including a response value in an authorization request header and other credentials. As an example, a register request 419 is shown that includes a response value: "ABC123" in the authorization header and the user's identity is indicated, e.g., indicating that the register request is from USER1@NETWORK.NET. In this example, the register request signal 419 includes the following headers To: USER1@NETWORK.NET and From: USER1@NETWORK.NET. The SBC receives and processes the register request 419 in step 420. In step 422 the SBC sends the register request (as signal 419') to the SIP registrar 108. In this example, the register request signal 419' includes the following headers To: USER1@NETWORK.NET and From: USER1@NETWORK.NET. In step 424 the SIP registrar 108 receives the register request 419' and calculates the expected response that the registrar expected from the UE device in response to the 401 challenge. The SIP registrar 108 compares the received response with the calculated response to determine whether or not there is a match. If there is a match the user is considered authentic, otherwise the user is considered not valid/authentic. To keep the discussion simple FIG. 4 illustrates the case where the SIP registrar 108 finds that the user is authentic and responds accordingly thereafter as discussed below.

After determining that the user is authentic, in step 426 the SIP registrar 108 sends a 200 OK (signal 427) to the UE through the SBC 106 confirming that authentication is successful. The SBC 106 receives the 200 signal in step 428. In step 430 the SBC sends the 200 OK (as signal 427') to the UE 102 which receives it in step 432 and considers that it has been authenticated. Following initial successful authentication, at some point in time later the UE device decides to establish a call, e.g., over a new TCP connection. In step 434 a new TCP connection is established.

In step 436 the UE device sends an INVITE signal 437 including the identity of the sender, e.g., indicating FROM: USER1@NETWORK.NET. In this example, the INVITE signal 437 includes the headers To: USER2@NETWORK.NET and From: USER1@NETWORK.NET. In this example, USER2@NETWORK.NET is the address of the callee that UE1 is attempting to establish a call with. The SBC receives and processes the INVITE signal 437 in step 438. Next in step 440 the SBC 106 uses the stored information (e.g., destination address specified in the earlier received register request from the UE 102 that the SBC has stored) and FROM header content, e.g., identity information and/or other information, in the received INVITE signal 437 to generate a new REGISTER request 441 and sends the generated REGISTER request 441 to the SIP Registrar 108. As can be seen in FIG. 4 the TO header of the generated new REGISTER request 441 is populated using the FROM header content of the INVITE signal 437. In this example, the register request 441 includes the headers To: USER1@NETWORK.NET and From: USER1@NETWORK.NET.

The SIP Registrar 108 receives and processes the REGISTER request 441 in step 442. In step 444, in response to the REGISTER request 441 the SIP Registrar 108 sends a 401 challenge (signal 445) to the SBC 106. In step 446 the SBC receives the 401 challenge and uses the WWW-Authenticate header content of the 401 challenge signal to challenge the UE 102 that sent the INVITE signal 437. In step 448 the SBC sends the 401 challenge (signal 449) to the UE 102 which receives the challenge in step 450.

In step 452 the UE device sends, in response to the 401 challenge (signal 449), an INVITE signal 453 including a response value and credentials in the authorization header. As an example the response value in the authorization header is shown as "KLM678" and the identification information indicates that the INVITE is from: USER1@NETWORK.NET. It should be noted that in contrast to the FIG. 2 example where the UE device uses the same response value in the authorization header of INVITE signal 245 as used in the earlier register request 219 during the registration process, in the FIG. 4 example the response value (e.g., KLM678) in the INVITE 453 is different from the response value (e.g., ABC123) used earlier and the same response cannot be used because of the use of cnonce and/or use of QOP in this embodiment. In this example, the INVITE signal 453 includes the following headers To: USER2@NETWORK.NET and From: USER1@NETWORK.NET. The SBC receives and processes the INVITE signal 453 in step 454. In step 456 the SBC generates a Register request 457 (also referred to as registration request) with credentials using stored information (e.g., information from previously stored register request 403) and the authorization header content received in the INVITE 453. The stored information from the earlier registration request includes, e.g., sender UE's identity information and destination address of the registration request which in this case is the address of the SIP Registrar 108. Thus the Register request 457 includes at least the response value from the authorization header of the INVITE 453. Further in step 456, having generated the new Register request 457, the SBC sends the Register request 457 to the SIP Registrar 108. In this example, the Request request 457 includes the headers To: USER1@NETWORK.NET and From: USER1@NETWORK.NET.

In step 458 the registrar receives the Register request 457 and compares the received response value in the Register request 457 with the expected response to determine whether or not there is a match. If there is a match, in step 460 the Registrar 108 authenticates the Register request 457 and replies with a 200 OK (signal 461) to the SBC. In step 462 the SBC receives the 200 OK signal 461 upon successful authentication by the registrar 108 and concludes that the TCP connection/call has been authenticated. In step 464 the SBC replies to the INVITE 453 from the UE 102 by sending a 200 OK (signal 461') to the UE indicating that the TCP connection/call is considered authenticated. In step 466 the UE receives the 200 OK signal 461' from the SBC.

It should be appreciated that steps 458 through 466 in the FIG. 4 example show the case where the TCP connection/call is authenticated to simplify the illustration and discussion. In the other scenario if in step 458 it is determined that there is no match the register request is rejected and SIP registrar replies with a 401 signal in step 460 instead of the 200 OK signal. Following receipt of a 401 signal from the SIP registrar the SBC in step 464 rejects the call and the TCP connection is terminated. In some but not all embodiments the authentication cycle may be repeated one or more times when the authentication fails the first time.

Figure 5A:
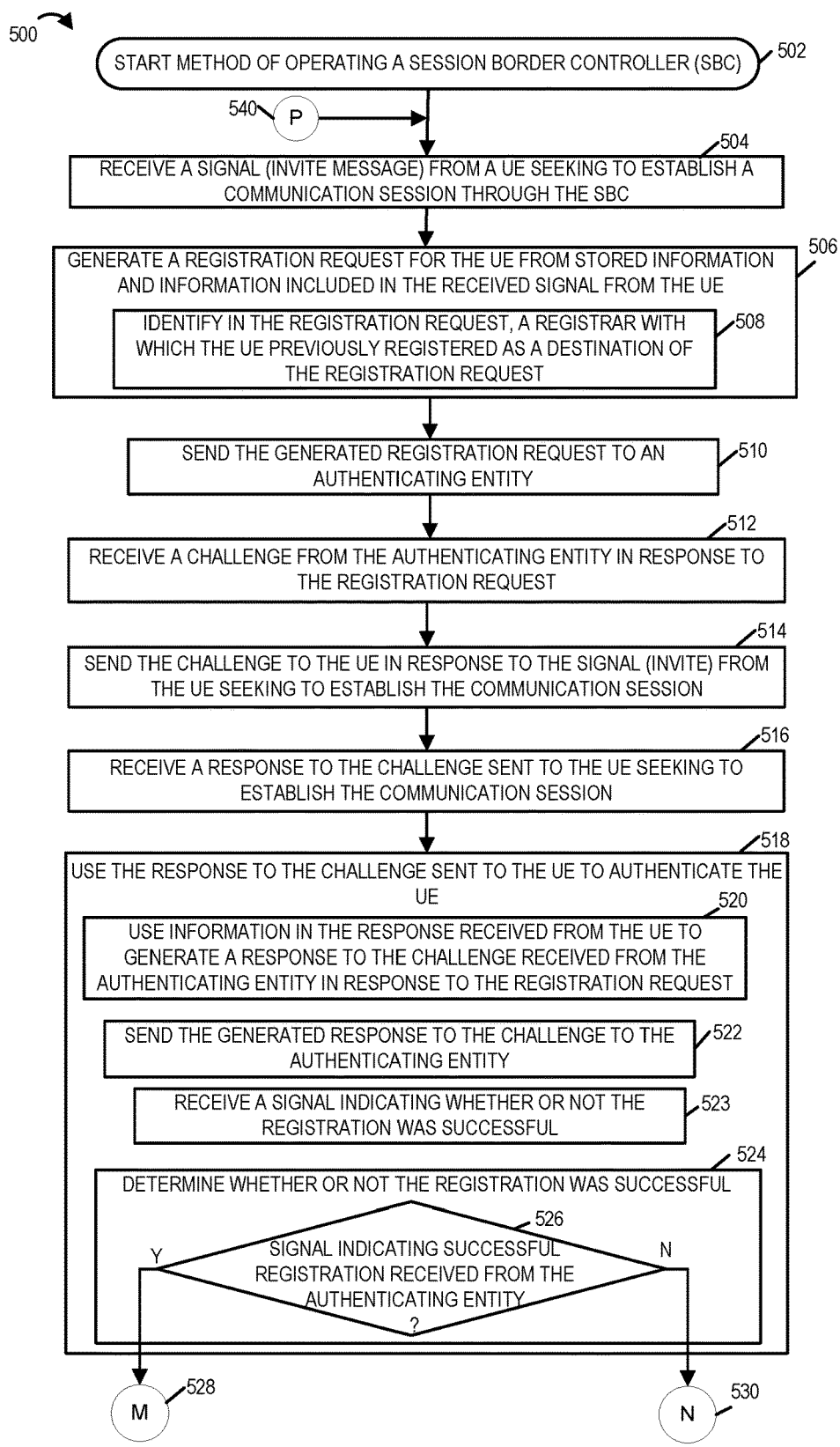
FIG. 5A illustrates a first part of a flowchart showing the steps of an exemplary method of operating a Session Border Controller (SBC) in accordance with another exemplary embodiment of the invention.
Figures 5, 5A, 5B:
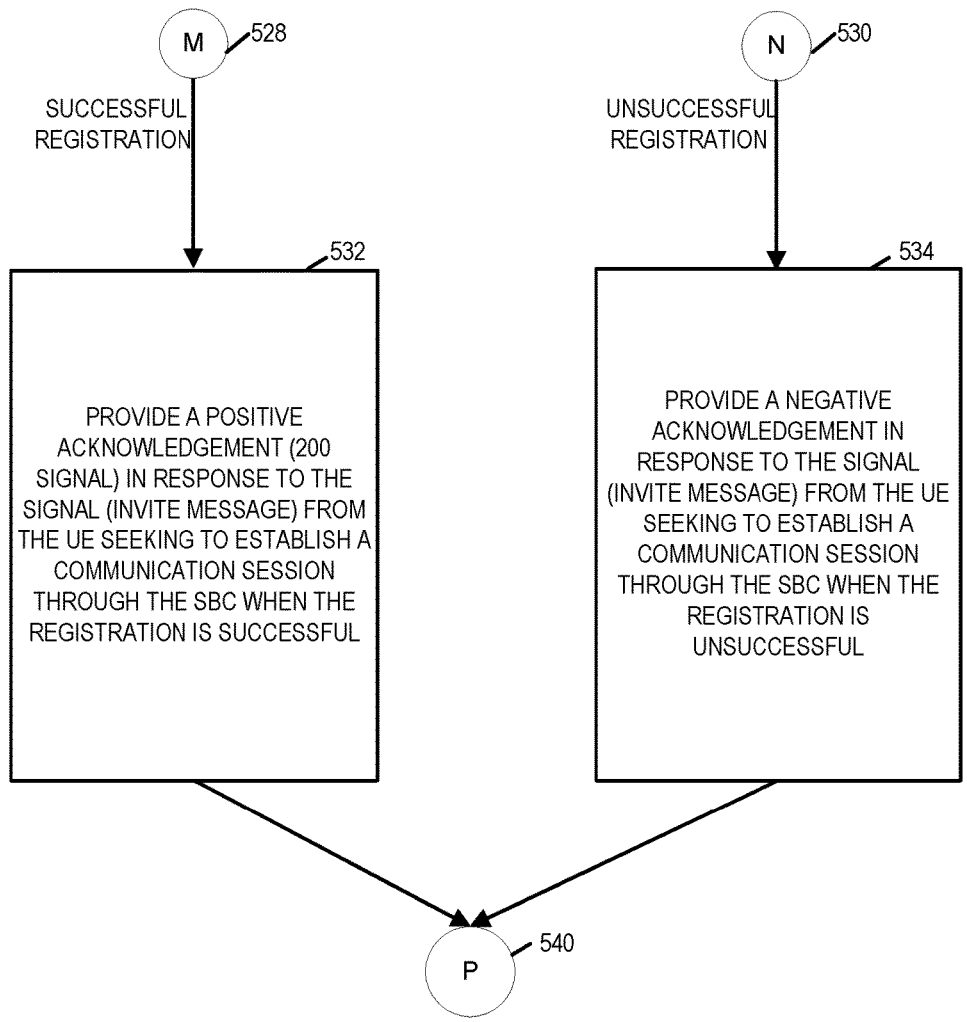
FIG. 5B illustrates a second part of the flowchart showing the steps of the exemplary method of operating a Session Border Controller (SBC).
FIG. 5 comprises the combination of FIGS. 5A and 5B.

FIG. 5, which comprises the combination of FIGS. 5A and 5B, is a flowchart of an exemplary method of operating a Session Border Controller (SBC) in accordance with one embodiment of the invention. The method of flowchart 500 includes steps performed by elements of an exemplary session border controller SBC 106 of system 100. For discussion purposes, reference to various signals illustrated in and discussed with regard to FIG. 4 will be made.

The exemplary method starts in step 502, e.g., with the session border controller being initialized and starting to monitor for messages, e.g., registration messages, invite messages and/or other messages from devices in the system. The operation proceeds from step 502 to step 504. In step 504 the SBC receives a signal (e.g., INVITE 437) from a UE seeking to establish a communication session through the SBC. Operation proceeds from step 504 to step 506. In step 506 the SBC generates a new registration request (e.g., register request 441) from the information, e.g., authorization header content) received in the received signal from the UE seeking communications and stored information. The stored information used for generating the registration request includes information from an earlier registration request received from the UE. The earlier registration request from the UE specifies a destination address of that registration request which is the address of a Registrar with which the UE is registering, e.g., SIP Registrar 108. The SBC may, and in some embodiments does, use the address and/or identifier of the Registrar stored by the SBC when the earlier registration request was received, as the destination of the new generated register request. Thus in various embodiments the SBC identifies a registrar with which the UE previously registered as a destination of the generated registration request as illustrated in step 508 which is performed, in some embodiments, as part of step 506.

Operation proceeds from step 506 to step 510. In step 510 the SBC sends the registration request generated by the SBC to an authentication entity, e.g., the SIP Registrar 108. Operation proceeds from step 510 to step 512. In step 512 the SBC receives a challenge (e.g., signal 445) from the authentication entity in response to the registration request. In accordance with one aspect of the invention, the SBC uses information in the received challenge signal, e.g., WWW-Authenticate header content, to challenge the UE seeking to establish communications through the SBC.

Operation proceeds from step 512 to step 514. In step 514 the SBC sends the challenge to the UE in response to the signal (e.g., INVITE 437) from the UE seeking to establish the communication session. As discussed with regard to the example illustrated in FIG. 4, in response to the challenge sent to the UE, the UE device sends an INVITE signal (e.g., signal 453) including a response value and credentials in the authorization header to the SBC.

Operation proceeds from step 514 to step 516. In step 516 the SBC receives and processes a response (e.g., INVITE 453 with credentials) to the challenge sent to the UE seeking to establish the communication session. In various embodiments the response from the UE includes authorization header with authorization value and other information. The response also includes the FROM header indicating the sender of the response. Operation proceeds from step 516 to step 518. In step 518 the SBC uses the received response from the UE to start an authentication process for authenticating the UE seeking to establish the communications session. In some embodiments step 518 includes steps 520, 522, 523 and 524 which are performed as part of the authentication step.

In step 520 the SBC generates, using stored information and information in the response received from the UE, a response (e.g., the Register request 457) to the challenge received from the authentication entity. In various embodiments the SBC uses information including, e.g., authorization header content with response value received in the response (e.g., INVITE 453) from the UE to generate the response. The stored information that may be used by the SBC for generating the response may, and in some embodiments does, include information from an earlier registration request received from the UE, e.g., destination address of the registration request from the UE, which in this case is the address of the SIP Registrar 108.

Next in step 522 the SBC sends the generated response to the authentication entity. In step 523 the SBC receives a signal back from the authenticating entity (e.g., 200 OK or a 401 signal) indicating whether or not the registration is successful. In some embodiments if the authentication performed by the authentication entity is successful, the authentication entity sends a 200 signal (e.g., signal 461) to the SBC indicating successful authentication and registration. In some embodiments when the authentication is unsuccessful, the authentication entity sends a 401 signal to the SBC indicating that authentication and thus registration failed.

In step 524 it is determined, e.g., based on the received signal from the authentication entity, whether or not the registration was successful. As part of determination step 524, in step 526 the SBC checks whether or not the received signal indicates successful registration (e.g., whether a 200 signal is received or a 401 signal is received). If it is determined that the received signal from the authentication entity indicates successful registration then this indicates that the response of the UE to the challenge was valid and the UE has been authenticated, the operation proceeds from step 518 to step 532 via connecting node M 528. In step 532, following determination that the registration has been successful, the SBC sends a positive acknowledgment (e.g., 200 signal) to the UE in response to the signal (e.g., INVITE 437) from the UE seeking to establish communications session through the SBC. The UE may then proceed with the call. Operation proceeds from step 532 back to step 504 via connecting node P 540 and the operation may continue in this manner for one or more received signals (e.g., INVITE) from one or more UE devices seeking to establish communications session through the SBC.

However if in step 524, it is determined that the received signal from the authentication entity indicates unsuccessful registration which indicates that the UE did not provide a valid response to the challenge and therefore was not authenticated, the operation proceeds from step 518 to step 534 via connecting node N 530. In step 534, following determination that the registration has been unsuccessful, the SBC sends a negative acknowledgment to the UE in response to the signal (e.g., INVITE 437) from the UE seeking to establish communications session through the SBC, the call is rejected and the TCP connection is closed. Operation proceeds from step 534 back to step 504 via connecting node P 540 and the operation may continue in this manner for one or more received signals (e.g., INVITE) from one or more UE devices seeking to establish communications session through the SBC.

In some embodiments of the present invention, Transport Layer Security (TLS) is used between SBC and UE to prevent an attacker from peeking into the messages thus in many cases the same nonce value can be used twice (e.g., once during registration by the SIP Registrar and once by the SBC to authenticate a later INVITE) without posing a security threat.

In some embodiments of the present invention, the Session Border Controller is configured to use both of the exemplary methods described in connection with FIG. 2 and FIG. 4. In some of such embodiments, the SBC first attempts to authenticate UE 1 using the method of FIG. 2 and if that fails then the SBC attempts to authenticate UE 1 using the method of FIG. 4. In some embodiments, the SBC is configured to attempt to authenticate UE 1 first using the method described in connection with FIG. 4 and if that method fails then the SBC attempts to use the method described in connection with FIG. 2. In some embodiments, the SBC is configured to use both of the exemplary methods described in connection with FIG. 2 and FIG. 4 and the SBC determines which method to use based on the QOP parameters sent by the Registrar during the initial UE 1 registration process. In some of such embodiments, when the QOP parameters indicate that the authentication algorithm to be used is auth-int the method described in connection with FIG. 4 is used otherwise the method described in connection with FIG. 2 is used. In some embodiments, the SBC makes the determination on which authentication method to use based on whether the authentication process includes the use of cnonce or not. In some of such embodiments, when a cnonce is determined to be used, the SBC uses the method described in connection with FIG. 4 and when a cnonce is determined not to be used as part of the authentication process then the method described in connection with FIG. 2 is used.

In general an INVITE is a SIP method that specifies the action that a user (e.g., Calling Party) wants the server to take. The INVITE request includes a number of header fields. These header fields are named attributes that provide additional information about the INVITE message. The header fields in an INVITE message may include a unique identifier for a call, a destination address, Calling Party Address, and information about the type of session that the user wishes to establish with the server.

Figure 6:
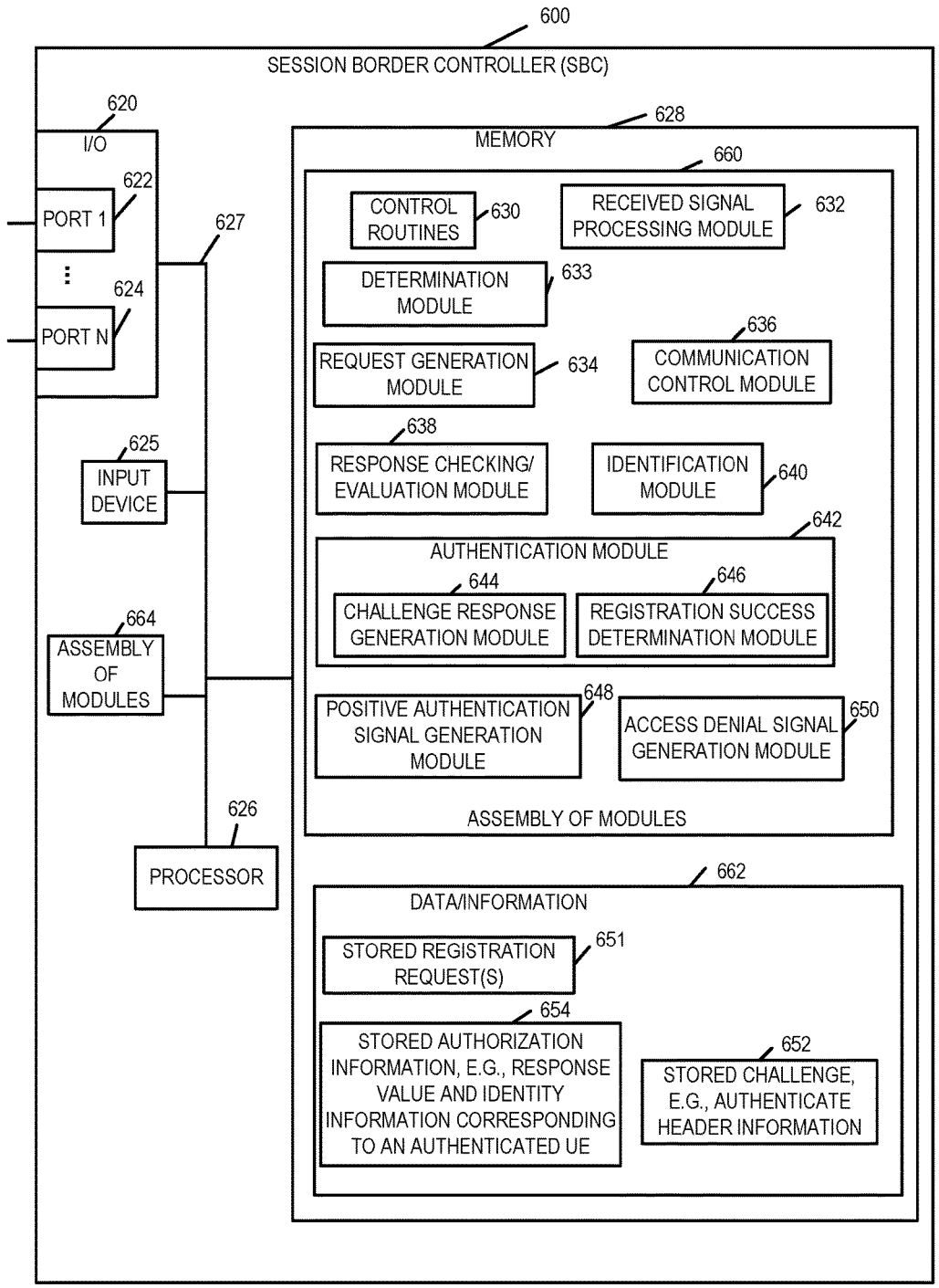
FIG. 6 illustrates an exemplary session border controller that implements the method of the present invention and can be used as the session border controller shown in FIG. 1 or any of the other figures.

FIG. 6 illustrates an exemplary session border controller 600 that implements the methods of the present invention and can be used as the session border controller 106 shown in FIG. 1 or any of the other figures.

The SBC 600 includes an input/output interface 620 including a plurality of ports 622, . . . , 624 via which the SBC 600 communicates with user devices 102, 103, 104, SIP registrar 108 and/or other devices in the network 100. The SBC 600 further includes an input device 625, a processor 626, an assembly of hardware modules 664 and memory 628. The various components of the SBC 600 are coupled together via bus 627 which allows for data to be communicated between the components of the SBC 600. The processor 626 controls the SBC 600 to operate in accordance with the invention and implement one or more of the methods of the present application. One or more parameters and/or commands can be input/changed via the input device 625 and/or select operations to be performed.

The memory 628 includes an assembly of modules 660 and data/information 662. The processor 626 executes various modules and/or control routines in the assembly of modules 660 and uses data/information 662 to control the SBC 600 to operate in accordance with the invention. The assembly of modules 660 includes control routines 630, a received signal processing module 632, a determination module 633, a request generation module 634, a communication control module 636, a response checking/evaluation module 638, an identification module 640, an authentication module 642, a positive authentication signal generation module 648, and an access denial signal generation module 650. Data/information 662 includes stored registration request(s) 651, stored challenge 652 and stored response 654. The assembly of modules 664 includes the above listed modules implemented in hardware.

The control routines 630 include device control routines and communications routines to control the operation of the SBC 600. The received signal processing module 632 is configured to process signals received by the SBC 600, e.g., via the interface 620, to recover communicated information, perform relevant actions based on content of received signal and/or provide input to one or more other modules based on the type of received signal or its content. For example, when a 401 challenge (e.g., signal 211 and/or signal 411) is received by the SBC 600 the signal processing module 632 processes the signal to determine whether QOP has been specified and accordingly whether or not an authenticate header can be stored by the SBC. The signal processing module 632 is further configured to provide input, e.g., based on the determination performed, to one or more modules and/or the processor 626.

The determination module 633 is configured to determine whether or not a received response (e.g., signal 219) to the challenge communicated from the UE to the authentication entity is valid. In various embodiments the determination module 633 is configured to make the determination if the response is valid based on receipt of a acknowledgement signal (e.g., 200 OK) from the authentication entity indicating that the response to the challenge is valid.

The request generation module 634 is configured to generate a Register request for a UE device (also referred to as registration request) from stored information 651 and using the contents (e.g., sender UE identity information and/or other information) of a received INVITE signal (e.g., INVITE 437) for sending to the SIP Registrar 108. In some embodiments the request generation module 634 is further configured to generate another Register request (e.g., signal 457) using the contents (e.g., response value in the authorization header and/or other information) of a received INVITE signal (e.g., INVITE 453) and stored information for sending to the SIP Registrar 108. In various embodiments the request generation module 634 is configured to identify, in a generated registration request, a registrar (e.g., SIP Registrar 108) with which the UE device previously registered, as a destination of the generated registration request.

The communication control module 636 is configured to control sending of one or more messages in accordance with the features of the invention to one or more devices, e.g., UE devices and/or SIP registrar, from the SBC 600, e.g., via the interface 620. For example the communication control module 636 is configured to control sending/forwarding of register requests (e.g., requests 203', 219', 403', 419', 441) to the SIP registrar 108. In various embodiments the communication control module 636 is configured to control sending of authentication 401 challenges (e.g., challenge 211', 241, 411', 449) as well as positive and negative acknowledgment signals to a UE device in accordance with the features of the invention. In some embodiments the communication control module 636 is configured to control sending of a 401 challenge to a UE requesting service, after it has been determined that the received response from the UE to a previous challenge is valid.

The response checking/evaluation module 638 is configured to check a received response (e.g., INVITE 245) from a UE device requesting service to determine whether or not the UE device is the same UE which was previously authenticated. In various embodiments the response checking/evaluation module 638 is configured to compare the received response from the UE device requesting service with a previously stored response corresponding to the challenge sent to the UE requesting service. If the compared responses match the response checking/evaluation module 638 determines that the UE device requesting service is the UE which was previously authenticated.

The identification module 640 is configured to identify a UE device which has requested service and which is responding to a 401 challenge, using UE identification information included in a response from the UE. The identification module 640 identifies the UE device and retrieves from the memory stored challenge and response information corresponding to the UE device. In some embodiments the identification module 640 provides this information to the response check/evaluation module 638 which in turn uses such information to check the response.

The authentication module 642 is configured to perform authentication operations in accordance with the methods of the present invention, e.g., such as discussed in steps 518, 520, 522, 523 and 524. Thus in various embodiments the authentication module 642 authenticates a UE device seeking to establish a communications session through the SBC by facilitating the authentication challenge-response process that involves the UE device and the authentication entity such as the SIP registrar. In various embodiments the authentication module 642 includes a challenge response generation module 644 and a registration success determination module 646. The challenge response generation module 644 is configured to generate a response (e.g., signal 457) to a challenge (e.g., signal 445) received from a authentication entity using information in a response (e.g., signal 453) received from the UE device seeking to establish a communications session through the SBC. The registration success determination module 646 is configured to determined whether or not a registration of the UE device seeking service was successful, e.g., based on receipt of a positive or negative acknowledgement signal from the authentication entity.

The positive acknowledgement signal generation module 648 is configured to generate a positive acknowledgement signal in response to receiving a confirmation signal from the authentication entity indicating that the device requesting service has been successfully authenticated and/or registered. The positive acknowledgement signal generation module 648 is further configured to generate the positive acknowledgement when the checking/evaluation module 638 determines (e.g., by comparing) that the received response from the UE requesting service matches the stored response. In some embodiments when authentication is successful, the processor 626 is configured to send the positive acknowledgement signal to the device requesting service indicating that the UE device has been authenticated and service access is granted.

The negative acknowledgement signal generation module 650 is configured to generate a negative acknowledgement signal in response to receiving a signal from the authentication entity indicating that the device requesting service has failed authentication and/or has not been registered. In some embodiments when authentication is unsuccessful, the processor 626 is configured to deny the requested service by sending the negative acknowledgement signal to the device requesting service. In some embodiments the negative acknowledgement signal generation module 650 is configured to generate the negative acknowledgement signal when the checking/evaluation module 638 determines (e.g., by comparing) that the received response from the UE requesting service does not match the stored response. In some such embodiments the processor 626 is configured to deny the requested service by sending the negative acknowledgement signal to the UE requesting service, e.g., when the comparing by the response checking/evaluation module 638 indicates that the received response from the UE requesting service does not match the stored response.

Stored registration request(s) 651 includes information from registration requests received from one or more UE devices. The SBC in some embodiments stores information included in received register requests for use in subsequent authentication process related operations and/or other operations performed by the SBC 600. The stored information 651 may include a plurality of sets of information, each corresponding to a registration request received from a different UE. The stored information 651 includes, for example, UE identity information of the UE sending the register request, destination address of the registration request, e.g., address and/or identity of the Registrar with which the corresponding UE is registered such as the SIP Registrar 108. In various embodiments the SBC 600 uses the stored registration request(s) information in generating new registration requests (e.g., register requests 441, 457) in accordance with the invention.

Stored challenge 652 includes information from a received 401 challenge (e.g., signal 211) including authenticate header information from the authentication entity in response to a registration request. Stored response 654 includes information from a received response (e.g., such as signal 219) including authorization information e.g., including response value and device identity information. In various embodiments the processor 626 controls the SBC to store and maintain a received challenge from the authentication entity and a response to the challenge, in memory 628, as stored information 652 and 654 respectively after the determination module 633 determines that the received response from the UE is determined to be valid. In some embodiments the processor 626 is further configured to discard the stored challenge and response when the determination module 633 determines that the received response from the UE is invalid. In some embodiments the SBC 600 uses the stored information 652, 654 to authenticate a UE device seeking service which has previously been authenticated, e.g., during a registration process, by the authentication entity.

While the above discussion focused on the assembly of modules 660, e.g., including software modules, in some embodiments the routines and/or modules of the present invention are implemented in hardware, e.g., as application-specific integrated circuits (ASICs) or other circuits. In such embodiments the modules are implemented in a circuit. Thus in at least some embodiments the implementation is made fully in hardware. The assembly of modules 664, which includes each of the above discussed modules implemented in hardware, is used in some such embodiments and is discussed below with regard to FIG. 7. In some embodiments the SBC 600 includes assembly of modules 660 while in some other embodiments the SBC 600 includes assembly of modules 664. Still in some other embodiments both the assembly of modules 660 and assembly of modules 664 are included in the SBC 600.

In some embodiments the I/O interface 620 is configured to implement the receiving and sending steps performed by the SBC 600 while the processor 626 is configured to perform other steps such as the monitoring, decision making and controlling steps performed by the SBC.

In various embodiments a device of any of one or more of Figures, e.g., session border controller or other device, includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the device cause the device to implement the corresponding step or operation. In still other embodiments, some or all of the modules are implemented as a combination of hardware and software.

Figure 7:
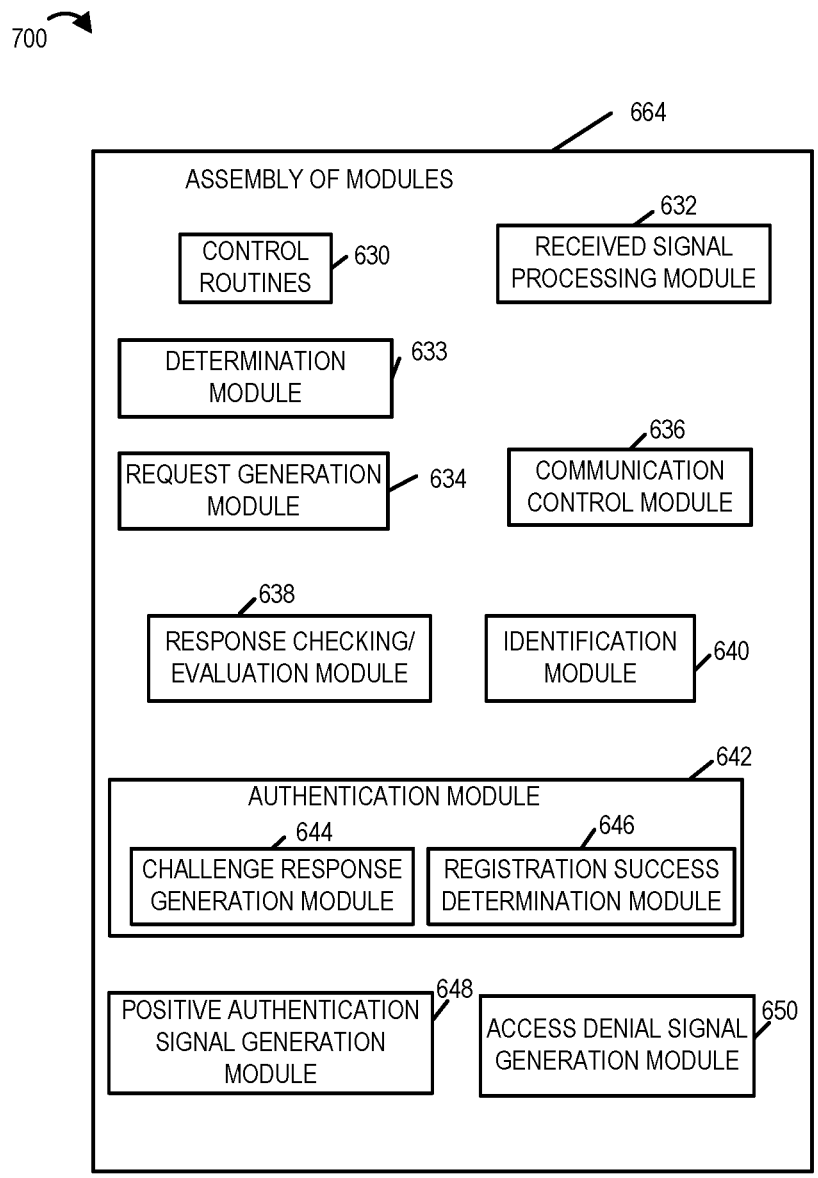
FIG. 7 illustrates an assembly of modules that can be used in the session border controller of FIGS. 1 and 6 in some embodiments.

FIG. 7 is a drawing 700 illustrating the assembly of modules 664 implemented in hardware which is used in the SBC 600 in some embodiments. The assembly of modules 664 includes each of the modules discussed above with regard to the SBC 600 but which has been implemented in hardware, e.g., as an ASIC, or a field-programmable gate array (FPGA) or other circuit. Thus the assembly of modules 664 includes a control circuit 630 embodying the control routines discussed above, a received signal processing module 632, a determination module 633, a request generation module 634, a communication control module 636, a response checking/evaluation module 638, an identification module 640, an authentication module 642, a positive authentication signal generation module 648, and an access denial signal generation module 650. The authentication module 642 in some embodiments includes a challenge response generation module 644 and a registration success determination module 646. The functions performed by these modules have been discussed in detail above and therefore such discussion will not be repeated.

Figure 8:
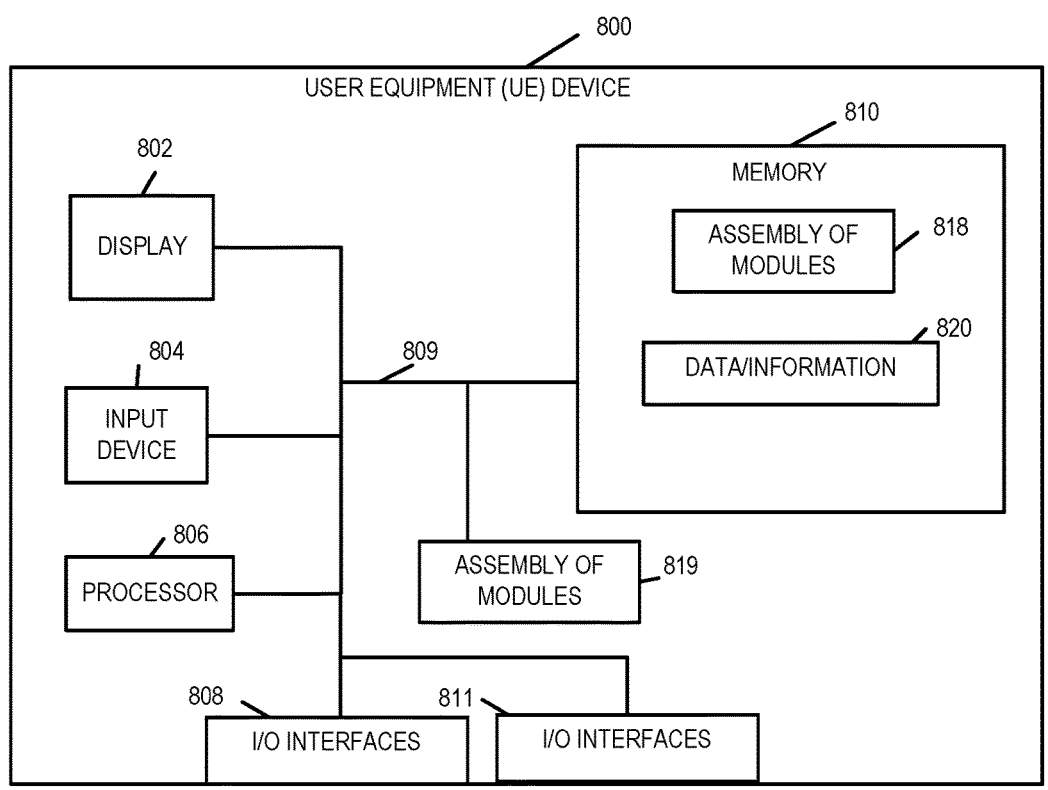
FIG. 8 illustrates an exemplary embodiment of a user equipment (UE) device in accordance with one embodiment of the present invention.

FIG. 8 illustrates an exemplary embodiment of a user equipment (UE) device 800 in accordance with one embodiment of the present invention. The exemplary UE device 800 can be used as UE device 102 or any one of the UE devices shown in FIG. 1. The UE device 800 performs various operation including, e.g., sending Register requests, Invite signals, response to challenges and/or other operations discussed with regard to the UE device 102.

Exemplary UE device 800 includes a display 802, an input device 804 such as a keypad, a processor 806, e.g., a CPU, I/O interfaces 808 and 811, memory 810, and an assembly of modules 819, e.g., circuits corresponding to different modules, coupled together via a bus 809 over which the various elements may interchange data and information. The I/O interfaces 808 and 811 include receivers and transmitters which couple the UE device 800 to various devices such as the SBC and networks. Memory 810 includes an assembly of modules 818, e.g., an assembly of software modules, and data/information 820. The assembly of modules 819 and/or 818 include modules for communicating over Internet Protocol networks using Session Initiation Protocol (SIP) and Session Description Protocol (SDP). The exemplary UE device 800 may, and in some embodiments is, implemented as a device such a Voice Over Internet Phone, a mobile phone, Smartphone, tablet, laptop computer or other communications device.

Figure 9:
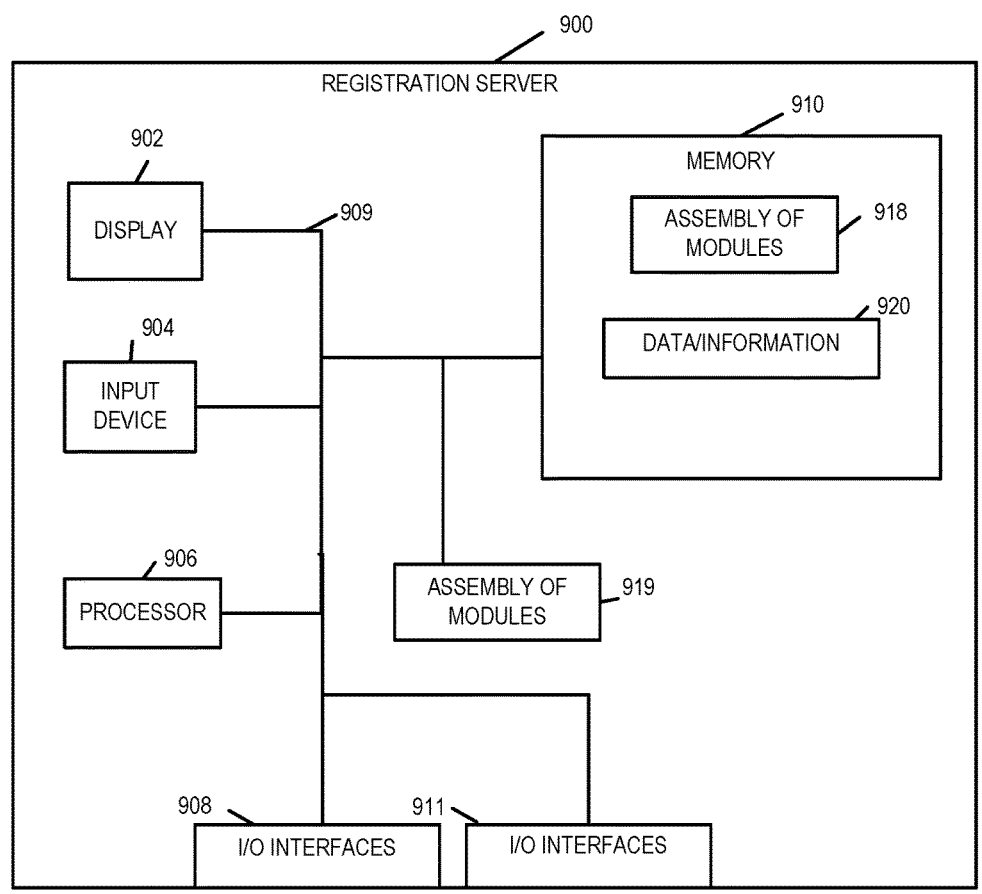
FIG. 9 illustrates an exemplary Registration server, e.g., a SIP registrar, implemented in accordance with one embodiment of the present invention.

FIG. 9 illustrates an exemplary Registration server 900, e.g., a SIP registrar, implemented in accordance with one embodiment of the present invention. The exemplary Registration server 900 can be used as the SIP registrar 108 of FIG. 1. The Registration server 900 performs various operation including, e.g., sending 401 challenges, authentication and/or registration operations discussed with regard to the SIP registrar 108.

The exemplary Registration server 900 includes a display 902, an input device 904 such as a keypad, a processor 906, e.g., a CPU, I/O interfaces 908 and 911, memory 910, and an assembly of modules 919, e.g., circuits corresponding to different modules, coupled together via a bus 909 over which the various elements may interchange data and information. The I/O interfaces 908 and 911 include receivers and transmitters which couple the registration server 900 to one or more devices such as the SBC. The registration server 900 can send and receive information via the I/O interfaces. Memory 910 includes an assembly of modules 918, e.g., an assembly of software modules, and data/information 920. The assembly of modules 919 and/or 918 include modules for communicating over Internet Protocol networks using Session Initiation Protocol (SIP) and Session Description Protocol (SDP).

An exemplary session border controller (SBC) implemented in accordance with one embodiment comprises: a processor configured to: store, in a memory, a challenge communicated to a user equipment device (UE) through the session border controller, said challenge being from an authenticating entity, and store, in said memory, a response to the challenge communicated from the UE to the authenticating entity; a determination module configured to determine if the stored response is a valid response; an interface configured to: receive a signal from a UE requesting service as part of an attempt to obtain new service through the session border controller; and send the stored challenge to the UE requesting service prior to providing the new service to the UE; and a response check module configured to check a response received from the UE requesting service to determine if the UE which is requesting service is the UE which was previously authenticated.

In some embodiments the determination module determines if said stored response is a valid response based on receipt of an acknowledgment signal from the authenticating entity indicating that the response to the challenge communicated from the UE is valid.

In some embodiments the processor is configured to control the session border controller to maintain said stored challenge and response in said memory after said determination module determines that said stored response is valid. In some embodiments the processor is configured to control the session border controller to discard said stored challenge and response from said memory after said determination module determines that said stored response is invalid.

In some embodiments the response check module is further configured to compare the received response from the UE requesting service to the stored response corresponding to the challenge sent to the UE requesting service, as part of being configured to check a response received from the UE to determine if the UE which is requesting service is the UE which was previously authenticated. In some embodiments the processor is configured to deny the requested service when the comparing indicated that the received response from the UE requesting service does not match the stored response.

In some embodiments the processor is further configured to store, in said memory, a UE identifier corresponding to the authenticated UE with said challenge and response. In some embodiments the signal from a UE requesting service includes said UE identifier as a source identifier. In some embodiments the response check module is further configured to retrieve from the memory the stored challenge and response corresponding to said UE identifier for use in authenticating said UE prior to providing the requested service.

In some embodiments the challenge and response communicated through said session border controller are communicated as part of an authentication process performed as part of registering said UE with a registrar. In some embodiments the signal from a UE requesting service is a SIP signal (e.g., invite) sent from the UE to the session border controller over a new TCP connection. In some embodiments the SBC does not store or have knowledge of a secret or key used by said authenticating entity to authenticate said UE.

In some embodiments an exemplary session border controller includes a non-transitory computer readable medium including processor executable instructions, the non-transitory computer readable medium comprising: instructions which when executed by at least one processor control said session border controller to store, in a memory, a challenge communicated to a user equipment device (UE) through the session border controller, said challenge being from an authenticating entity; instructions which when executed by the at least one processor control said session border controller to store, in said memory, a response to the challenge communicated from the UE to the authenticating entity; instructions which when executed by the at least one processor control said session border controller to determine if said stored response is a valid response; instructions which when executed by the at least one processor control said session border controller to receive a signal from a UE requesting service as part of an attempt to obtain new service through the session border controller; instructions which when executed by the at least one processor control said session border controller to send, after determining that said stored response is valid, the stored challenge to the UE requesting service prior to providing the new service to the UE; and instructions which when executed by the at least one processor control said session border controller to check a response received from the UE requesting service to determine if the UE which is requesting service is the UE which was previously authenticated.

An exemplary session border controller (SBC) implemented in accordance with some embodiments comprises: an interface configured to: receive a signal from a user equipment device (UE) seeking to establish a communication session through the SBC; send a registration request for the UE, generated by the session border controller, to an authenticating entity; receive a challenge from the authenticating entity in response to the registration request; and send the challenge to the UE in response to the signal from the UE seeking to establish the communication session through the SBC; and an authentication module configured to authenticate the UE using a response to the challenge sent to the UE.

In some embodiments the authentication module includes a challenge response generation module configured to generate, using information in the response received from the UE, a response to the challenge received from the authenticating entity in response to the registration request. In some embodiments the interface is configured to send the generated response to the challenge to the authenticating entity. In some embodiments the authentication module further includes a registration success determination module configured to determine whether said registration was successful or not. In some embodiments the registration success determination module determines whether said registration was successful or not based on receipt of a signal indicating successful registration from the authenticating entity.

In some embodiments the SBC further includes a positive acknowledgment signal generation module configured to generate and provide a positive acknowledgement, when said registration is successful, in response to said signal from the UE seeking to establish a communication session through the SBC; and a negative acknowledgment signal generation module configured to generate and provide a negative acknowledgement, when said registration is unsuccessful, in response to said signal from the UE seeking to establish a communication session through the SBC.

In some embodiments the SBC further includes a registration request generation module configured to generate said registration request for the UE from stored information, said registration request generation module being configured to identify, in the registration request, a registrar with which the UE previously registered as a destination of said registration request.

In some embodiments the authenticating entity is a Registrar. In some embodiments the SBC does not store or have knowledge of a secret or key used by said authenticating entity to authenticate said UE.

In some embodiments an exemplary session border controller includes a non-transitory computer readable medium including processor executable instructions, the non-transitory computer readable medium comprising: instructions which when executed by at least one processor control said session border controller to receive a signal from a user equipment device (UE) seeking to establish a communication session through the SBC; instructions which when executed by at least one processor control said session border controller to send a registration request for the UE, generated by the session border controller, to an authenticating entity; instructions which when executed by at least one processor control said session border controller to receive a challenge from the authenticating entity in response to the registration request; instructions which when executed by at least one processor control said session border controller to send the challenge to the UE in response to the signal from the UE seeking to establish the communication session through the SBC; and instructions which when executed by at least one processor control said session border controller to authenticate the UE using a response to the challenge sent to the UE.

The techniques of various embodiments may be implemented using software, hardware and/or a combination of software and hardware. Various embodiments are directed to apparatus, e.g., border controllers, telecommunications systems, network nodes and/or network equipment devices. Various embodiments are also directed to methods, e.g., method of controlling and/or operating border controllers, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented.

In various embodiments nodes and/or elements described herein are implemented using one or more modules to perform the steps corresponding to one or more methods, for example, message reception, signal processing, checking, authenticating, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a session border controller (SBC), the method comprising:
   storing by the session border controller, in a memory of the session border controller, a challenge communicated to a first user equipment device through the session border controller, said challenge being from an authenticating entity;
   storing by the session border controller, in said memory, a response to the challenge communicated from the first user equipment device to the authenticating entity;
   determining by the session border controller if said stored response is a valid response;
   receiving by the session border controller a user equipment device request signal requesting service as part of an attempt to obtain new service through the session border controller;
   sending by the session border controller, after determining that said stored response is valid, the stored challenge to a user equipment device from which the user equipment device request signal was received prior to providing the new service to the user equipment device from which the user equipment device request signal was received, said user equipment device from which the user equipment device request signal was received being either the first user equipment device or a second user equipment device;
   checking by the session border controller a response received from the user equipment device from which the user equipment device request signal was received to determine if the user equipment device from which the user equipment device request signal was received which is requesting service is the first user equipment device which was previously authenticated; and
   wherein said SBC does not store or have knowledge of a secret or key used by said authenticating entity to authenticate said first user equipment device; and
   wherein checking a response received from the user equipment device from which the user equipment device request signal was received to determine if the user equipment device from which the user equipment device request signal was received which is requesting service is the first user equipment device which was previously authenticated includes:
      comparing the received response from the user equipment device from which the user equipment device request signal was received to the stored response from the first user equipment device to the authenticating entity corresponding to the challenge sent to the user equipment device from which the user equipment device request signal was received which is requesting service.

2. The method of claim 1, further comprising:
   denying the requested service when said comparing indicates that the received response from the user equipment device from which the user equipment device request signal was received does not match the stored response.

3. The method of claim 2, further comprising:
   storing a user equipment device identifier corresponding to the authenticated first user equipment device with said stored challenge and response; and
   wherein said user equipment device request signal requesting service includes said user equipment device identifier as a source identifier, the method further comprising:
   retrieving from said memory the stored challenge and response corresponding to said user equipment device identifier for use in authenticating said user equipment device from which the received user equipment device request signal was received prior to providing the requested service.

4. The method of claim 3, wherein said challenge and response communicated through said session border controller are communicated as part of an authentication process performed as part of registering said first user equipment device with a registrar, said registrar being said authenticating entity that uses said secret or key to authenticate said first user equipment device.

5. The method of claim 4, wherein said user equipment device request signal requesting service is a Session Initiation Protocol (SIP) signal sent from the first user equipment device to the session border controller over a new Transmission Control Protocol (TCP) connection.

6. The method of claim 1, wherein said determining by the session border controller if said stored response is a valid response includes:

receiving by the session border controller a Session Initiation Protocol message from said authenticating entity in response to the response of the first user equipment device to the challenge communicated through the session border controller from said authenticating entity to said first user equipment device; and determining by the session border controller whether the Session Initiation Protocol (SIP) message from said authenticating entity in response to the response of the first user equipment device to the challenge communicated through the session border controller from said authenticating entity to said first user equipment device indicates the first user device was successfully authenticated.

7. The method of claim 6, wherein said session border controller determines that the stored response is valid when said Session Initiation Protocol (SIP) message from said authenticating entity received in response to the response of the first user equipment device to the challenge communicated through the session border controller from the first user equipment device to the authenticating entity is a SIP 200 OK message.

8. The method of claim 1 further comprising:
maintaining the stored challenge and response in said memory when the SBC determines that the stored response is a valid response.

9. The method of claim 1 further comprising:
discarding the stored challenge and response when the SBC determines that the stored response is not a valid response.

10. A session border controller (SBC) comprising:
memory; and
a processor that controls the session border controller to:
store in said memory a challenge communicated to a first user equipment device through the session border controller, said challenge being from an authenticating entity;
store in said memory a response to the challenge communicated from the first user equipment device to the authenticating entity;
determine if said stored response is a valid response;
receive by the session border controller a user equipment device request signal requesting service as part of an attempt to obtain new service through the session border controller;
send after determining that said stored response is valid, the stored challenge to a user equipment device from which the user equipment device request signal was received prior to providing the new service to the user equipment device from which the user equipment device request signal was received, said user equipment device from which the user equipment device request signal was received being either the first user equipment device or a second user equipment device; and
check a response received from the user equipment device from which the user equipment device request signal was received to determine if the user equipment device from which the user equipment device request signal was received which is requesting service is the first user equipment device which was previously authenticated; and
wherein said session border controller does not store or have knowledge of a secret or key used by said authenticating entity to authenticate said first user equipment device; and
wherein said processor controls said session border controller to compare the received response from the user equipment device from which the user equipment device request signal was received to the stored response corresponding to the challenge sent to the user equipment device from which the user equipment device request signal was received as part of said check a response received from the user equipment device from which the user equipment device request signal was received to determine if the user equipment device from which the user equipment device request signal was received which is requesting service is the first user equipment device which was previously authenticated.

11. The session border controller of claim 10, wherein said processor further controls said session border controller to deny the requested service when said comparing indicates that the received response from the user equipment device from which the user equipment device request signal was received does not match the stored response.

12. The session border controller of claim 11, wherein said processor further controls the session border controller to:

store a user equipment device identifier corresponding to the authenticated first user equipment device with said stored challenge and response; and wherein said user equipment device request signal includes said user equipment device identifier as a source identifier, the processor further controlling the session border controller to:

retrieve from said memory the stored challenge and response corresponding to said user equipment device identifier for use in authenticating said user equipment device from which the user equipment device request signal was received prior to providing the requested service.

13. The session border controller of claim 12, wherein said challenge and response communicated through said session border controller are communicated as part of an authentication process performed as part of registering said first user equipment device with a registrar, said registrar being said authenticating entity that uses said secret or key to authenticate said first user equipment device.

14. The session border controller of claim 13, wherein said user equipment device request signal is a Session Initiation Protocol (SIP) signal sent from the first user equipment device to the session border controller over a new Transmission Control Protocol (TCP) connection.

* * * * *